United States Patent [19]
Vichutinsky et al.

[11] 3,791,202
[45] Feb. 12, 1974

[54] DIFFERENTIAL MICROCALORIMETER

[76] Inventors: Alfred Alfredovich Vichutinsky, ulitsa Vavilova, 86, kv. 213; Boris Jurievich Zaslavsky, Bolshaya Dorogomilovskaya, 56, kv. 25, both of Moscow, U.S.S.R.

[22] Filed: Feb. 23, 1972

[21] Appl. No.: 228,659

[52] U.S. Cl. ............................................ 73/15 B
[51] Int. Cl. ....................... G01k 17/00, G01n 25/20
[58] Field of Search ................................ 73/15, 190

[56] References Cited
UNITED STATES PATENTS
3,059,471   10/1962   Ialvet .................................. 73/190

OTHER PUBLICATIONS

Evans et al., "Calorimetry for Biochemical Analysis," in Analytical Biochemistry, Vol. 11, No. 3, Je 1965, pgs. 451–456.

Primary Examiner—Herbert Goldstein
Attorney, Agent, or Firm—Holman & Stern

[57] ABSTRACT

A differential microcalorimeter employs a thermostat which accommodates a device for temperature equalization in the thermostat, the device accommodating a detector block with measuring cells symmetrically arranged in relation to a longitudinal axis of the device. In each measuring cell provision is made for a calorimetric cell holder having a longitudinal axis and composed of a plurality of heat conducting and insulating material layers disposed one above another in the direction of the longitudinal axis of the calorimetric cell holder. The material of each layer and the sequence of the layers correspond to the materials of the thermostat, the temperature equalizing device, the detector block and the measuring cell when the calorimetric cell holder is inserted into measuring cells, thereby effecting the closure of the temperature fields around the measuring cells.

1 Claim, 2 Drawing Figures

PATENTED FEB 12 1974  3,791,202
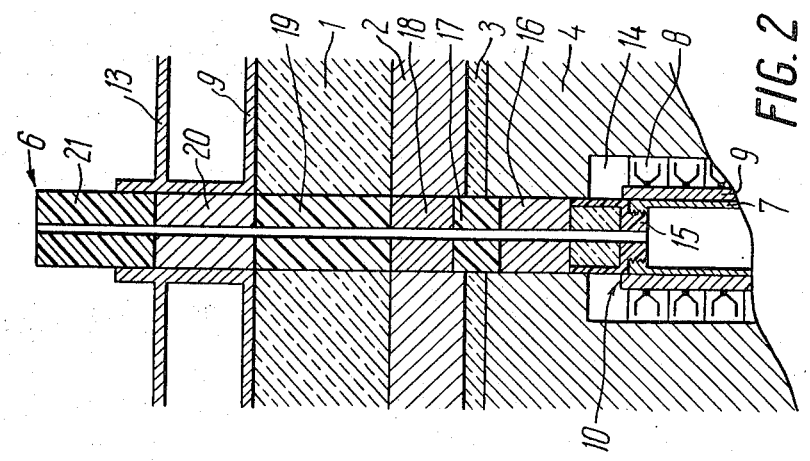
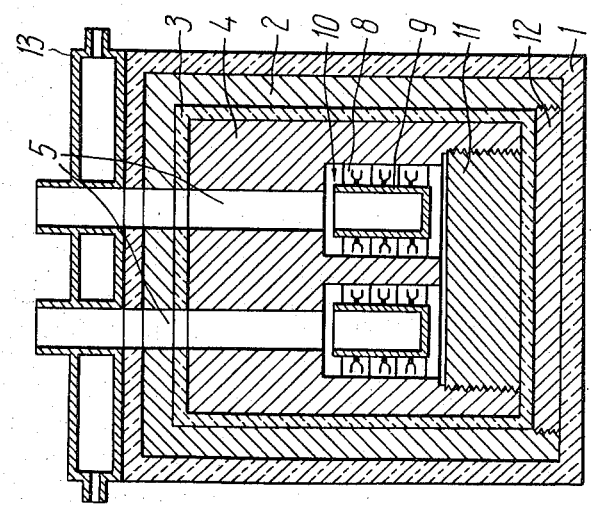
FIG. 1
FIG. 2

DIFFERENTIAL MICROCALORIMETER

BACKGROUND OF THE INVENTION

1. Field of the Invention

This invention relates to the field of calorimetry and, more specifically, is concerned with differential microcalorimeters.

2. Description of Prior Art

The known differential microcalorimeters comprise a thermostat which houses a device for thermostat temperature equalization, the device encasing a detector block with microcalorimetric cells symmetrically disposed about the longitudinal axis of the block and furnished with cell holders.

In the prior art differential microcalorimeters, the device for thermostat temperature equilization consists of cylinders separated from one another with thermal insulation and intended for uniformly distributing the external temperature fluctuations, and cones whose function is to couple the detector block to the cylinders.

The cylinders serve for minimizing the nonuniformity of the thermostat temperature field, while the cones convert lateral thermal disturbances into axial ones, the microcalorimeter detector block being less sensitive to the latter type of thermal disturbances.

In the detector block of prior art differential microcalorimeters, provision is made for sockets symmetrically disposed in relation to the longitudinal axis of the block and accommodating measuring cells, microcalorimetric cells with cell holders being inserted into the sockets. To introduce a microcalorimetric cell into a measuring cell, use is made of a cell holder comprising a thin-walled plastic tube furnished with partitions.

It is often pertinent to ensure, in the course of calorimetric experiments, proper access into the microcalorimetric cell in order to start the process being examined. The employment of the cell holder having the above-identified design with a view to providing direct communication between the microcalorimetric cell and the ambient medium in the microcalorimeter imposes additional stringent requirements on the conditions of thermostatting and, hence, necessitates a more elaborate thermostat design and the incorporation thereinto of heat flux-equalizing cones, the cones increasing the overall dimensions of the microcalorimeter and, therefore, raising the price of microcalorimeters

SUMMARY OF THE INVENTION

In is an object of the present invention to provide a differential microcalorimeter wherein high sensitivity is combined with moderate requirements as to thermostatting conditions.

This object is accomplished by the provision of a differential microcalorimeter comprising a thermostat, a device for uniform distribution of heat in the thermostat, the device being disposed inside the thermostat so as to envelope a detector block furnished with measuring cells which are symmetrically arranged in relation to a longitudinal axis of the detector block, each measuring cell accommodating a calorimetric cell holder, further, according to the invention, each calorimetric cell holder consists of a plurality of layers made of heat conducting and thermoinsulating materials disposed one above another in the direction of the longitudinal axis of the holder in such a manner that the material of each layer and the sequence of layers corresponds to the materials of the thermostat, the device for uniform distribution of heat in the thermostat, the detector block, and the measuring cell when calorimetric cell holders are inserted into the measuring cells, thereby making for the closure of temperature fields around the measuring cells.

The fact that the cell holder of the differential microcalorimeter, according to the present invention, functions as a device for equalizing the external temperature gradients is conducive to making the thermostatting requirements less stringent, to diminishing markedly the overall dimensions of the microcalorimeter, to simplifying the microcalorimeter design, and to making the instrument less expensive.

BRIEF DESCRIPTION OF THE DRAWING

The present invention is illustrated hereinafter by the description of an exemplary embodiment thereof with reference to the accompanying drawings wherein FIG. 1 is a vertical sectional view of the present differential microcalorimeter, without cell holders and calorimetric cells;

FIG. 2 shows in vertical section the socket for inserting the cell holder with the calorimetric cell of the present microcalorimeter with the calorometric cell and the cell holder in place, according to the invention.

DESCRIPTION OF THE PREFERRED EMBODIMENT

The differential microcalorimeter of the invention (FIG. 1) comprises a thermostat (not shown in the drawing) which accommodates a device for uniform distribution of heat in the thermostat, the device being enclosed in thermal insulation 1, e.g. foamed plastic, and consisting in the present microcalorimeter embodiment of a metal cylinder 2 intended for equalization of external temperature fluctuations.

The metal cylinder 2 accommodates a monolithic detector block 4 separated from the wall of the cylinder 2 with thermal insulation 3, e.g. foamed plastic, provision being made in the detector block 4 for two sockets 5 disposed symmetrically in relation to a longitudinal axis of the detector block, cell holders 6 (FIG. 2) with calorimetric cells 7 being inserted into the sockets 5. Semiconductor thermoelements 8 (FIG. 1) are cemented to the walls of the expanded part of the sockets 5 by means of a heat conducting compound (FIG. 1), the ends of the thermoelements 8 directed inwardly in the socket 5 being bonded by a heat conducting compound to the walls of a shell 9 comprising a thin-walled metal cartridge whose diameter equals that of the constricted part of the socket 5, so that said cartridge is freely supported by the thermoelements 8 in the expanding portion of the socket 5.

The shell 9 with the semiconductor thermoelements 8 constitutes a measuring cell 10 and provision is made in each measuring cell 10 to connect the thermoelements 8 in series so as to obtain thermoelectric piles, while the resulting thermopiles are connected in opposition according to a differential diagram. The thermopile leads pass through the apertures in the cover 11 of the detector block 4 and the cover 12 of the large mass, heat capacity and heat conductivity cylinder 2 and connected to an amplifier.

The microcalorimeter is disposed in a thermostat and closed with a thermostatted cover 13.

The cell holder 6 (FIG. 2), on being inserted into the microcalorimeter socket 5, tightly adjoins with its lateral surface the walls of said socket 5. The metal calorimetric cell 7 (capacity, 2 cm³) is screwed onto the bottom end of the cell holder 6, which cell holder is made of a plurality of layers of heat conducting and thermoinsulating materials disposed one above another in the direction of the longitudinal axis of the cell holder 6. In the specific embodiment described herein the layers are arranged as follows: when the calorimetric cell 7 is introduced into the shell 9 of the measuring cell 10 up to the stop, a plastic layer 15, to which the calorimetric cell is affixed and having a cavity which is packed with foamed plastic, will, in the vertical plane, be disposed adjacent to an air gap 14 between the measuring cell 10 and the detector block 4 ; the subsequent layer 16 is composed of a metal similar to that of the detector block 4 and having a thickness in the vertical direction, limited essentially by the height of the detector block 4, followed by a plastic layer 17, whose vertical thickness should not be less than the thickness of the foamed plastic insulation 3, and the material of which is similar to that of the insulation 3, and a metal layer 18 of similar material to the material used for the temperature equalizing cylinder 2 and having a thickness not exceeding that of the cylinder 2, with which the metal layer 18 is brought into contact.

Subsequent layers 19, 20 and 21 are made of plastic, metal and plastic, respectively, and are similar in thickness and composition to the foamed plastic thermal insulation 1, the thermostatted cover 13, and the ambient medium of the microcalorimeter, respectively.

All the aforesaid layers are cemented together and form the solid cell holder 6 having a centrally located through hole to provide access to the calorimeter cell 7.

The layers 16, 18 and 20 of the cell holder are intended for closing the temperature fields in the detector block 4, the cylinder 2 and the thermostatted cover 13 of the microcalorimeter, respectively, across the socket 5 (FIG. 1), whereas the layers 15 / FIG. 16, 17, 19 and 21 made of plastic materials serve to insulate the thus-obtained temperature fields from one another.

To carry out relevant measurements, a test specimen is charged into one of the calorimetric cells 7, while in the other calorimetric cell is placed a reference specimen. The calorimetric cells 7 are secured to the cell holders 6 and inserted into the shells 9 of the measuring cells 10.

This step results in the onset of external heat disturbances in the microcalorimeter, the intensity of the disturbances being reduced due to the provision of the thermal insulation 1 and 3 and the layers 15, 17, 19 and 21 of the cell holder , while the cylinder 2 and the layers 16, 18 and 20 of the cell holder provide for distributing uniformly the heat disturbances.

Once heat equilibrium has been established in the detector block 4, the calorimetric experiment is started, the heat changes involved in the process under examination being recorded.

In the microcalorimeter, according to the invention, high sensitivity is attained because of the outstanding efficiency of heat protection afforded to the present microcalorimeter by the cylinder for equalizing the external heat fluctuations, the cylinder being thermally insulated from the thermostat and detector block , as well as by the cell holders built up by heat conducting and heat insulating materials intended for the closure of temperature fields around the measuring cells.

The differential microcalorimeter designed as disclosed hereinbefore is noted for its sensitivity of $5 \times 10^{-9}$ cal./mm under steady heat evolution conditions (3 mcV on the amplifier scale) and with a calorimetric cell of a 2 cm³ capacity.

We claim:

1. A differential microcalorimeter for use with a thermostat and comprising:

means disposable in said thermostat for causing uniform distribution of heat in said thermostat, said means being composed of a heat conducting material and surrounded by a thermoinsulating material;

detector block means having a longitudinal axis and composed of a heat conducting material contained within said uniform heat distributor means, said detector block means being surrounded by a thermoinsulating material disposed between said detector block means and said uniform heat distributor means;

measuring cells provided within said detector block and symmetrically arranged in relation to said longitudinal axis of said detector block, and communicating exteriorly of said microcalorimeter by means of walled sockets formed along the direction of said longitudinal axis so that the walls of said sockets define successive layers of said heat conducting and thermoinsulating material;

calorimetric cell holder means for inserting in each of said sockets so as to be in interworking relationship with each of said measuring cells, said cell holder means being built-up of succeeding layers of heat conducting and thermoinsulating material in the direction of said longitudinal axis of said detector block means, so that when said cell holder means are inserted in said sockets, said cell holder means contact the walls of said sockets and are so disposed therein that the heat conducting and thermoinsulating layers of the walls of said sockets are adjacent the heat conducting and thermoinsulating layers respectively of said cell holder means, thereby closing the temperature field around said measuring cells.

* * * * *